United States Patent Office 3,092,593
Patented June 4, 1963

3,092,593
PREPARATION OF POLYURETHANE FOAM
Leonard I. Nass, Oceanport, and Walter Alexander Stamm, Highland Park, N.J., assignors to Carlisle Chemical Works, Inc., Reading, Ohio
No Drawing. Filed May 8, 1959, Ser. No. 811,787
1 Claim. (Cl. 260—2.5)

The invention relates to improvements in the catalytic preparation of polyurethane foams, and to the foams thus produced.

Throughout the specification and claim, the term "polyurethane" is used in its generally accepted meaning to designate the reaction products obtained by condensing polyisocyanates and organic poly-hydroxyl compounds, particularly polyether glycols such as polyethylene and polypropylene glycols of a molecular weight of about 400 to 2000, and also alkylene oxide adducts, for instance propylene oxide adducts, of triols, such as glycerol, trimethylol methane, and other polyols. The reactants useful for the polyurethane formation are well known and described in many publications, for instance, in the book "Polyurethanes," by Bernard A. Dombrow, published by Reinhold Publishing Corporation, New York. As also set forth in said book, the urethane foam manufacture is generally carried out in a two-step reaction, where a prepolymer containing excess diisocyanate is first formed by reacting isocyanate and glycol at elevated temperatures, which prepolymer is then further reacted with water in the presence of a catalyst such as a tertiary amine.

Recently, it has been shown that organotin esters of aliphatic acids, such as dibutyltindilaurate and dibutyltin di-2-ethylhexoate, are suitable catalysts which make it possible to produce urethane foams, particularly flexible foams, commercially in the so-called "one-shot" procedure. Foams prepared from systems containing said catalysts have, however, inherently a certain permanent tackiness which is objectionable for many uses of the foams, for instance for upholstery and the like.

We have found that said drawback is avoided by using as catalysts diorganotin mercapto compounds which are solid at atmospheric temperatures and have a melting point of at least about 50° C. Particularly suitable are diorganotin compounds in which the radical of a mercapto acid is bound through the sulfur of the sulfhydryl group as well as through the oxygen of the carboxyl group to the tin atom of the organotin group. Such compounds which may be designated 2,2-dihydrocarbontin-1-oxa-2-stanna-3-thia cycloalkanones, and are

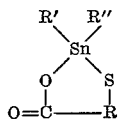

A suitable method of preparation is described in Patent No. 2,636,891 of Walter A. Gregory. These compounds are also disclosed in application Ser. No. 329,481, filed January 2, 1953, now Patent No. 2,914,506, by Gerry P. Mack and Emery Parker, for Halogen-Containing Resins Stabilized With Organo-Tin Mercapto Compounds. For the sake of simplicity, we represent the compounds obtained by the various preparation methods as monomers. However, they may also occur as polymers, and the entire group may be best represented as compounds consisting of one or more units of the formula

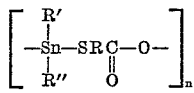

where n is a numeral from 1 to 6 and may be a fractional value, designating mixtures of the compounds of different polymerization degrees.

In the above formulas, R is the radical of a mercapto acid, such as beta mercaptopropionic acid, thioglycolic acid, thiosalicyl acid, and the like. R' and R" are the same or different monovalent hydrocarbon radicals; they may be alkyls such as methyl, ethyl, propyl, butyl, 2-ethylhexyl, vinyl, or aryls, such as phenyl or benzyl, or alicyclic groups such as cyclohexyl.

For use as catalysts, the compounds are preferably applied in a volatile organic solvent such as benzene or toluene. They may be used alone or in combination with other catalysts like tertiary amines. They have the further advantage that they are effective already in very small amounts of about 0.02 percent by weight, calculated on the amount of the polyol component. The upper limit will be about 1 percent, but may, of course, be higher if so desired.

Foams prepared with the use of our novel catalysts have exceptionally low density, uniform cell structure, good compression and deflection set properties, and high tensile strength, and are completely free of any tackiness.

The following example is given to illustrate the invention.

*Example*

A batch was prepared from 1058 g. of a polypropylene triol, which had been obtained by reaction of propylene oxide and glycerol and had a molecular weight of 3000 and a hydroxyl number of 56, 5.25 g. of a silicone oil of commerce (Silicone X 520 of Union Carbide Chemicals Company, which silicone is a polymeric tetraethylorthosilicate), and 30.6 g. of water. 73 g. of said batch were mixed thoroughly at room temperature with 0.1 g. of 2,2-dibutyl-1-oxa-2-stanna-3-thia-cyclohexan-6-one, dissolved in 0.2 g. of toluene, in an open box of 12 sq. inches base.

To said mixture, there were added at room temperature 26.8 g. of tolylene diisocyanate at once and stirred vigorously. Gas evolution started within 50 seconds, and the formed polyurethane foam rose to a height of almost 10 inches. Curing to an elastic foam took place overnight.

Similar effects have been obtained when using as a catalyst a solution of 0.1 g. of 2,2-dibutyl-1-oxa-2-stanna-3-thia-cyclopentan-5-one in 0.5 g. of CCl₄. With the same effect, we have used 0.1 g. of 2,2-diphenyl-1-oxa-2-stanna-3-thia-cyclopentan-5-one, and 0.1 g. of 2,2-dibenzyl-1-oxa-2-stanna-3-thia cyclohexan-6-one.

We claim:
In the preparation of polyurethane foam from organic polyisocyanates, polyethers containing hydroxyl groups, and water, the improvement which consists in incorporating in the reaction mixture about 0.02 to 1 percent by weight, calculated on said polyether of a 2,2-dihydrocarbontin-1-oxa-2-stanna-3-thia cycloalkanone of the formula

wherein R' and R" are monovalent hydrocarbon radicals, and R is a divalent alkylene group.

References Cited in the file of this patent
UNITED STATES PATENTS

| | | |
|---|---|---|
| 2,764,565 | Hoppe et al. | Sept. 25, 1956 |
| 2,926,148 | Leclercq et al. | Feb. 23, 1960 |
| 2,955,056 | Knox | Oct. 4, 1960 |